(12) United States Patent
Ozgur

(10) Patent No.: US 9,629,131 B2
(45) Date of Patent: Apr. 18, 2017

(54) ENERGY-AWARE MULTIMEDIA ADAPTATION FOR STREAMING AND CONVERSATIONAL SERVICES

(71) Applicant: INTEL CORPORATION, Santa Clara, CA (US)

(72) Inventor: Oyman Ozgur, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 549 days.

(21) Appl. No.: 14/041,476

(22) Filed: Sep. 30, 2013

(65) Prior Publication Data

US 2014/0095670 A1    Apr. 3, 2014

Related U.S. Application Data

(60) Provisional application No. 61/707,784, filed on Sep. 28, 2012.

(51) Int. Cl.
*G06F 15/16* (2006.01)
*H04W 72/04* (2009.01)
(Continued)

(52) U.S. Cl.
CPC .......... *H04W 72/0413* (2013.01); *H04B 5/00* (2013.01); *H04B 17/318* (2015.01); *H04J 3/1694* (2013.01); *H04J 11/0086* (2013.01); *H04L 1/1812* (2013.01); *H04L 1/1864* (2013.01); *H04L 5/0035* (2013.01); *H04L 5/0055* (2013.01); *H04L 5/0057* (2013.01);
(Continued)

(58) Field of Classification Search
CPC ............ H04L 65/4084; H04N 21/6181; H04N 21/23439; H04N 19/70; H04W 24/04; G10L 25/78

USPC .................... 709/231, 217; 348/583; 725/62; 375/240.02; 704/233
See application file for complete search history.

(56) References Cited

U.S. PATENT DOCUMENTS

2001/0034601 A1* 10/2001 Chujo ..................... G10L 25/78
                                                    704/233
2008/0310446 A1    12/2008 Bellwood et al.
(Continued)

FOREIGN PATENT DOCUMENTS

| KR | 10-2009-0040533 A | 4/2009 |
|---|---|---|
| WO | 2005/022852 A1 | 3/2005 |
| WO | 2014/052956 A1 | 4/2014 |

OTHER PUBLICATIONS

3rd Generation Partnership Project; Technical Specification Group Services and System Aspects; IP Multimedia Subsystem (IMS); Multimedia Telephony; Media handling and interaction (Release 11), 3GPP TS 26.114 V11.4.0 (Jun. 2012), 263 Pages.

(Continued)

*Primary Examiner* — Dustin Nguyen
(74) *Attorney, Agent, or Firm* — Thorpe North & Western

(57) ABSTRACT

Technology to provide is disclosed. In an example, a user equipment (UE) can include computer circuitry configured to: receive a manifest file for an HTTP adaptive stream from a node; identify an energy characterization in the manifest file for a plurality of representations for a selected period; select a representation for the selected period having a desired energy characterization; and request segments from the node that are in the representation having the desired energy characterization.

18 Claims, 11 Drawing Sheets

(51) Int. Cl.

| | | |
|---|---|---|
| *H04W 48/14* | (2009.01) | |
| *H04W 76/04* | (2009.01) | |
| *H04W 76/02* | (2009.01) | |
| *H04L 29/06* | (2006.01) | |
| *H04W 52/02* | (2009.01) | |
| *H04W 24/02* | (2009.01) | |
| *H04W 40/00* | (2009.01) | |
| *H04W 76/06* | (2009.01) | |
| *H04B 17/318* | (2015.01) | |
| *H04B 5/00* | (2006.01) | |
| *H04J 3/16* | (2006.01) | |
| *H04J 11/00* | (2006.01) | |
| *H04L 1/18* | (2006.01) | |
| *H04L 5/14* | (2006.01) | |
| *H04L 12/24* | (2006.01) | |
| *H04L 29/08* | (2006.01) | |
| *H04W 4/00* | (2009.01) | |
| *H04W 8/08* | (2009.01) | |
| *H04W 24/08* | (2009.01) | |
| *H04W 24/10* | (2009.01) | |
| *H04W 28/02* | (2009.01) | |
| *H04W 28/08* | (2009.01) | |
| *H04W 28/16* | (2009.01) | |
| *H04W 36/00* | (2009.01) | |
| *H04W 36/22* | (2009.01) | |
| *H04W 40/24* | (2009.01) | |
| *H04W 48/16* | (2009.01) | |
| *H04W 48/20* | (2009.01) | |
| *H04W 52/04* | (2009.01) | |
| *H04W 52/14* | (2009.01) | |
| *H04W 72/02* | (2009.01) | |
| *H04W 72/12* | (2009.01) | |
| *H04W 74/00* | (2009.01) | |
| *H04W 88/02* | (2009.01) | |
| *H04W 36/08* | (2009.01) | |
| *H04W 48/18* | (2009.01) | |
| *H04W 88/08* | (2009.01) | |
| *H04L 5/00* | (2006.01) | |
| *H04W 72/00* | (2009.01) | |
| *H04W 80/10* | (2009.01) | |
| *H04W 88/18* | (2009.01) | |

(52) U.S. Cl.
CPC ............ *H04L 5/0073* (2013.01); *H04L 5/14* (2013.01); *H04L 41/5032* (2013.01); *H04L 65/4084* (2013.01); *H04L 65/60* (2013.01); *H04L 65/602* (2013.01); *H04L 65/608* (2013.01); *H04L 67/10* (2013.01); *H04W 4/005* (2013.01); *H04W 8/08* (2013.01); *H04W 24/02* (2013.01); *H04W 24/08* (2013.01); *H04W 24/10* (2013.01); *H04W 28/0215* (2013.01); *H04W 28/0221* (2013.01); *H04W 28/08* (2013.01); *H04W 28/16* (2013.01); *H04W 36/0061* (2013.01); *H04W 36/0083* (2013.01); *H04W 36/0088* (2013.01); *H04W 36/22* (2013.01); *H04W 40/005* (2013.01); *H04W 40/246* (2013.01); *H04W 48/14* (2013.01); *H04W 48/16* (2013.01); *H04W 48/20* (2013.01); *H04W 52/0209* (2013.01); *H04W 52/0212* (2013.01); *H04W 52/0235* (2013.01); *H04W 52/0258* (2013.01); *H04W 52/04* (2013.01); *H04W 52/14* (2013.01); *H04W 72/02* (2013.01); *H04W 72/042* (2013.01); *H04W 72/044* (2013.01); *H04W 72/0406* (2013.01); *H04W 72/0486* (2013.01); *H04W 72/1284* (2013.01); *H04W 74/002* (2013.01); *H04W 74/004* (2013.01); *H04W 76/022* (2013.01); *H04W 76/025* (2013.01); *H04W 76/043* (2013.01); *H04W 76/046* (2013.01); *H04W 76/048* (2013.01); *H04W 76/06* (2013.01); *H04W 88/02* (2013.01); *H04L 5/001* (2013.01); *H04W 36/08* (2013.01); *H04W 48/18* (2013.01); *H04W 52/0261* (2013.01); *H04W 72/005* (2013.01); *H04W 80/10* (2013.01); *H04W 88/08* (2013.01); *H04W 88/18* (2013.01); *Y02B 60/50* (2013.01)

(56) References Cited

U.S. PATENT DOCUMENTS

| | | | |
|---|---|---|---|
| 2009/0054102 A1 | 2/2009 | Jung | |
| 2011/0093605 A1* | 4/2011 | Choudhury | H04L 65/4084 709/231 |
| 2012/0209952 A1* | 8/2012 | Lotfallah | H04L 65/4084 709/217 |
| 2013/0342762 A1* | 12/2013 | Wang | H04N 19/70 348/583 |
| 2014/0010282 A1* | 1/2014 | He | H04N 21/23439 375/240.02 |
| 2014/0040498 A1* | 2/2014 | Oyman | H04W 24/04 709/231 |
| 2014/0245359 A1* | 8/2014 | De Foy | H04N 21/6181 725/62 |

OTHER PUBLICATIONS

Digital cellular telecommunications system (Phase 2+); Universal Mobile Telecommunications System (UMTS); LTE; Transparent end-to-end packet switched streaming service (PSS); 3GPP file format (3GP) (3GPP TS 26.244 version 11.1.0 Release 11) ETSI TS 126 244 V11.1.0 (Oct. 2012), 62 Pages.

Digital cellular telecommunications system (Phase 2+); Universal Mobile Telecommunications System (UMTS); LTE; Multimedia Messaging Service (MMS); Media formats and codecs (3GPP TS 26.140 version 11.1.0 Release 11) ETSI TS 126 140 V11.1.0 (Oct. 2012), 15 Pages.

Universal Mobile Telecommunications System (UMTS); LTE; Multimedia Broadcast/Multicast Service (MBMS); Protocols and codecs (3GPP TS 26.346 version 11.2.0 Release 11), ETSI TS 126 346 V11.2.0 (Oct. 2012), 161 Pages.

Universal Mobile Telecommunications System (UMTS); LTE; Transparent end-to-end Packet-switched Streaming Service (PSS); Protocols and codecs (3GPP TS 26.234 version 11.1.0 Release 11), ETSI TS 126 234 V11.1.0 (Oct. 2012), 175 Pages.

Universal Mobile Telecommunications System (UMTS); LTE; Transparent end-to-end Packet-switched Streaming Service (PSS); Progressive Download and Dynamic Adaptive Streaming over HTTP (3GP-DASH) (3GPP TS 26.247 version 11.0.0 Release 11), ETSI TS 126 247 V11.0.0 (Oct. 2012),114 Pages.

3rd Generation Partnership Project; Technical Specification Group Services and System Aspects; Transparent end-to-end packet switched streaming service (PSS); 3GPP file format (3GP) (Release 11), 3GPP TS 26.244 V11.1.0 (Sep. 2012) 60 Pages.

3rd Generation Partnership Project; Technical Specification Group Services and System Aspects; IP Multimedia Subsystem (IMS); Multimedia Telephony; Media handling and interaction (Release 8) 3GPP TS 26.114 V8.12.0 (Sep. 2012) 164 Pages.

3rd Generation Partnership Project; Technical Specification Group Services and System Aspects; Multimedia Messaging Service (MMS); Media formats and codecs (Release 11) 3GPP TS 26.140 V11.1.0 (Sep. 2012) 13 Pages.

3rd Generation Partnership Project; Technical Specification Group Services and System Aspects; Transparent end-to-end Packet-

(56) References Cited

OTHER PUBLICATIONS switched Streaming Service (PSS); Protocols and codecs (Release 9) 3GPP TS 26.234 V9.9.0 (Jun. 2012) 188 Pages.

3rd Generation Partnership Project; Technical Specification Group Services and System Aspects; Transparent end-to-end Packet-switched Streaming Service (PSS); Progressive Download and Dynamic Adaptive Streaming over HTTP 3GP-DASH) (Release 10) 3GPP TS 26.247 V10.2.0 (Jun. 2012), 110 Pages.

3rd Generation Partnership Project; Technical Specification Group Services and System Aspects; Multimedia Broadcast/Multicast Service (MBMS); Protocols and codecs (Release 9), 3GPP TS 26.346 V9.7.0 (Jun. 2012), 166 Pages.

International Search Report and Written Opinion received for PCT Patent Application No. PCT/US2013/062606, mailed on Jan. 28, 2014, 14 Pages.

Zhan et al, "Embedding Content Information in Video Streams for Energy-efficient Video Processing on Mobile Devices", International Organisation for Standardisation Organisation Internationale De Normalisation Iso/Iec Jtc1/Sc29/Wg11 Coding of Moying Pictures and Audio, Jul. 2012, 4 pages, Stockholm, Sweden.

\* cited by examiner

ENERGY-AWARE MULTIMEDIA ADAPTATION FOR STREAMING AND CONVERSATIONAL SERVICES

RELATED APPLICATIONS

This application claims the benefit of and hereby incorporates by reference U.S. Provisional Patent Application Ser. No. 61/707,784, filed Sep. 28, 2012.

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
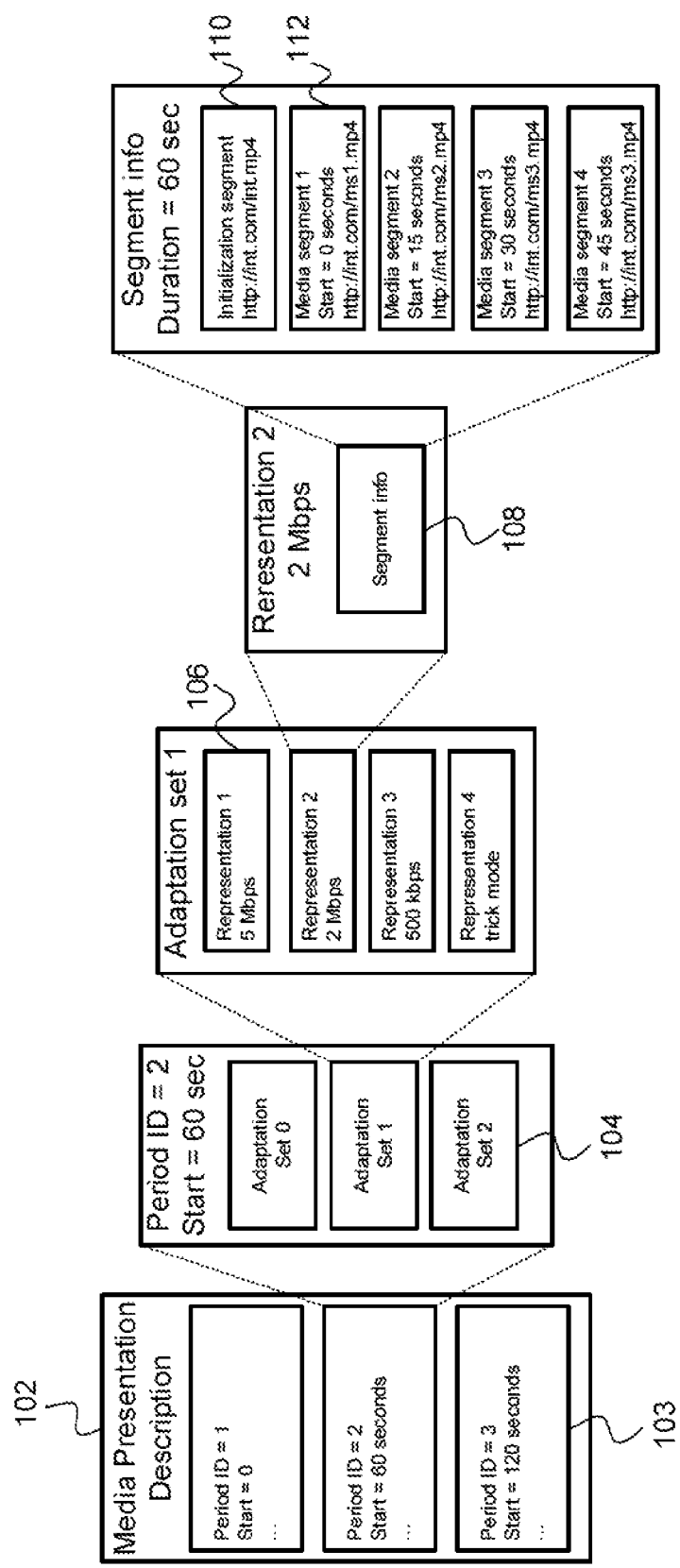
FIG. 1 illustrates a block diagram of a media presentation description (MPD) metadata file configuration in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The amount of power available to mobile communication devices has been fairly constant for years. The demands on mobile communication devices to be used for more power intensive services, such as video streaming and video conferencing increases the amount of power used at the mobile communication devices. The rise in power consumption will continue with a market demand that is trending toward more advanced video services. For instance, the use of high-definition (HD) video services at resolution levels of 1024p, 2048p, 4096p, etc. and three-dimensional (3D) video services such as those based on the Moving Picture Experts Group's (MPEG's) multi-view coding (MVC) standard) and more advanced codecs, such as those based on MPEG's High Efficiency Video Coding (HEVC) standard, which are known to consume substantially more power.

However, with the power available in battery technology remaining substantially constant, there is an amplified need to increase the power efficiency of the services offered on the mobile communication devices. The encoding and decoding processes used in video streaming and video conferencing have not necessarily been developed based on power efficiency, since they have historically been used on desktop and fixed location computing devices. The amount of power consumed in a mobile communication device during the process of encoding, transmitting, receiving, and decoding can be significant. Accordingly, there is a need to improve the efficiency when streaming and conferencing services are used on mobile communication devices. Accordingly, mobile video applications can be configured to not only provide a good viewing experience, but also to avoid excessive energy consumption through the use of powerful codecs and high definition video, especially when mobile devices are running low on the amount of power available in their battery.

A mobile device consists of many parts, which require power. Among them video codec and display subsystem (as well as their associated memory) are two major power consumption sources for video processing. Video decoding power consumption can depend on the capabilities of the computer processing unit (CPU) or graphics processing unit (GPU). Video display power consumption can depend on display resolution, display size and display type. Unlike older monochrome displays, recent LCD or OLED mobile displays can consume relatively large amounts of power. In addition, power consumption of platform components for network transmission, including wireless communications and radio-level processing can also be significant. The choice of media players, container formats, and streaming protocols (e.g., RTSP, progressive download, HTTP adaptive streaming, etc.) can significantly impact the amount of power consumption.

In today's deployments, media streaming energy consumption is far from optimal. The intelligent adaptation of multimedia for media streaming and conversational services can provide important enhancements in energy/power efficiency of mobile devices. Video streaming service providers, device vendors and network operators can impact significantly the battery life time by selecting an optimal video player, coding and container solution, by delivering the content over the radio with the most energy efficient traffic model, and by optimizing the radio parameters accordingly.

In one example, with the availability of multiple versions of the same video content at different quality levels, selecting a low quality version of the video clip can provide important savings in battery power due to a reduction in the amount of data transmitted over the wireless medium. For instance, the reduced data can not only reduce the amount of bits transmitted or received, it can also increase the availability of sleep cycles for a power saving mode of the mobile device. In addition, the decreased amount of data in a low quality version of the video clip can decrease the amount of processing required for decoding and rendering the content. In summary, there's an opportunity to design new multimedia adaptation techniques to optimize energy consumption that varies dramatically between devices, services, media players and video qualities.

Wireless Multimedia Standards

There have been a number of multimedia standards that have been developed to enable multimedia to be communicated to, from, or between mobile computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). An MTSI-based transmitter UE terminal can capture and records video, and then transfer the video to an MTSI-based receiver UE terminal over a 3GPP network. The receiver UE terminal can then decode and render the video. The 3GPP TS 26.140 also enables video sharing using multimedia sharing services (MMS), in which support for the 3GP file format is provided.

The standards described above are provided as examples of wireless multimedia standards that can be used to communicate multimedia files to, from, and/or between multimedia devices. The examples are not intended to be limiting. Additional standards may be used to provide streaming video, conversational video, or video sharing.

Streaming Media Standards

A more detailed explanation of HTTP streaming, and more particularly, the DASH standard is provided herein, in context with embodiments of the present invention. The detailed explanation is not intended to be limiting. As will be further explained in the proceeding paragraphs, the embodiments of the present invention can be used to efficiently communicate multimedia to, from, and/or between mobile devices by enabling the mobile devices, or the servers in communication with the mobile devices, to select and/or communicate multimedia having a desired energy characterization. The multimedia can be communicated using a standardized or non-standardized communication scheme.

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable simplified streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

DASH is a standardized HTTP streaming protocol. As illustrated in FIG. 1, DASH can specify different formats for a media presentation description (MPD) metadata file 102 that provides information on the structure and different versions of the media content representations stored in the server as well as the segment formats. The MPD metadata file contains information on the initialization and media segments for a media player (e.g., the media player can look at initialization segment to determine a container format and media timing information) to ensure mapping of segments into a media presentation timeline for switching and synchronous presentation with other representations. DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the bandwidth that is available to a mobile device changes. Thus, DASH can allow for fast adaptation to changing network and wireless link conditions, user preferences and device capabilities, such as display resolution, the type of central processing unit (CPU) employed, the memory resources available, and so forth. The dynamic adaptation of DASH can provide a better quality of experience (QoE) for a user, with shorter startup delays and fewer rebuffering events than other streaming protocols.

Figure 2:
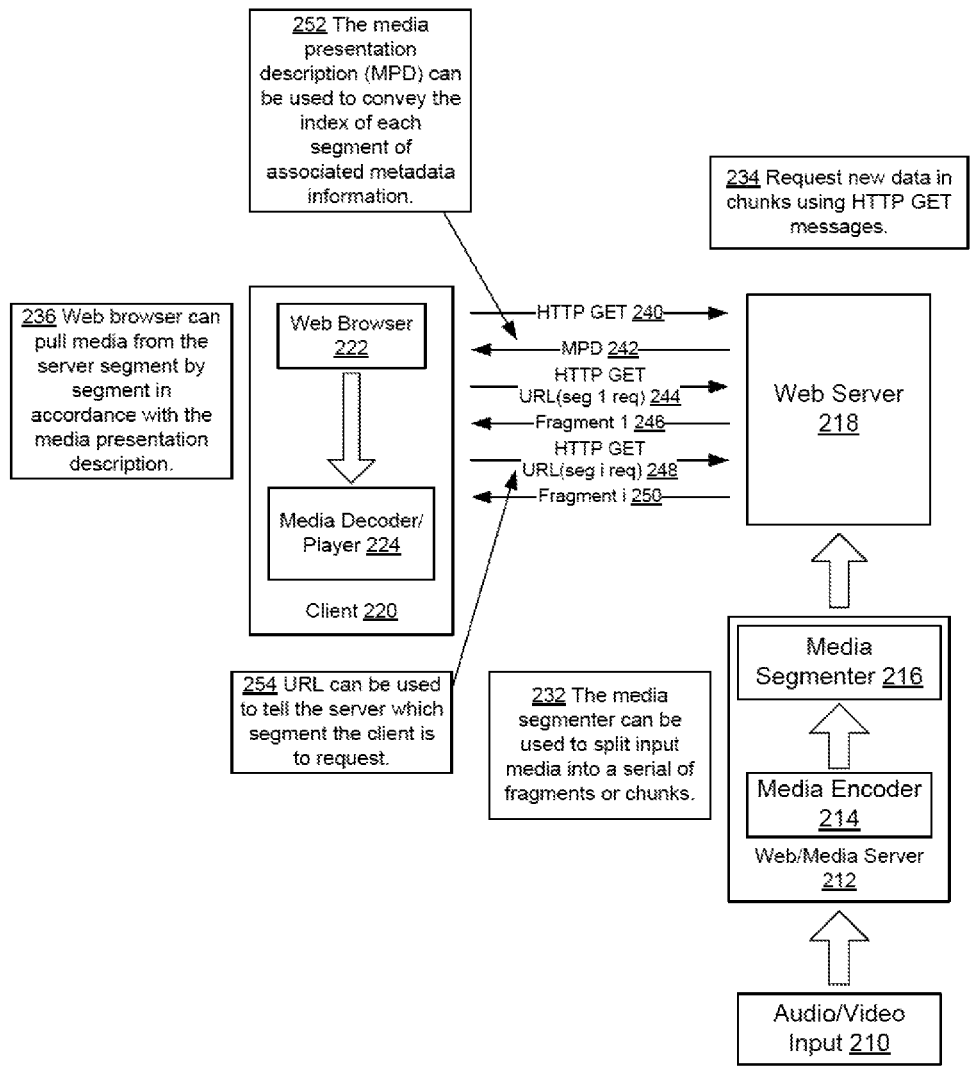
FIG. 2 illustrates a block diagram of hypertext transfer protocol (HTTP) streaming in accordance with an example.

In DASH, a media presentation description (MPD) metadata 102 can provide information on the structure and different versions of the media content representations stored in a web/media server 212, as illustrated in FIG. 2. In the example illustrated in FIG. 1, the MPD metadata is temporally divided into periods having a predetermined length, such as 60 seconds in this example. Each period can include a plurality of adaptation sets 104. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set may also include audio in different languages. The different alternatives offered in the adaptation set are referred to as representations 106.

In FIG. 1, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video may also be available in different formats, such as two dimensional (2D) or three dimensional (3D) video. Each representation 106 can include segment information 108. The segment information can include initialization information 110 and the actual media segment data 112. In this example, an MPEG 4 (MP4) file is streamed from a server to a mobile device. While MP4 is used in this example, a wide variety of different codecs may be used, as previously discussed.

The multimedia in the adaptation set can be further divided into smaller segments. In the example of FIG. 1, the 60 second video segment of adaptation set 1 is further divided into four sub-segments 112 of 15 seconds each. These examples are not intended to be limiting. The actual length of the adaptation set and each media segment or sub-segment is dependent on the type of media, system requirements, potential types of interference, and so forth.

The actual media segments or sub-segments may have a length that is less than one second to several minutes long.

As shown in FIG. 2, the MPD metadata information can be communicated to a client 220, such as a mobile device. A mobile device can be a wireless device configured to receive and display streaming media. In one embodiment, the mobile device may only perform part of this function, such as receiving the streaming media and then communicating it to another device or a display device for rendering. The mobile device can be configured to run a client 220. The client can request the segments using an HTTP GET 240 message or a series of partial GET messages. The client can control the streaming session, such as managing an on-time request and smooth play-out of a sequence of segments, or potentially adjusting bitrates or other attributes, to react to changes of a wireless link, a device state or a user preference.

FIG. 2 illustrates a DASH-based streaming framework. A media encoder 214 in the web/media server 212 can encode an input media from an audio/video input 210 into a format for storage or streaming. A media segmenter 216 can be used to split the input media into a series of segments 232, which can be provided to a web server 218. The client 220 can request new data in segments using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations as shown in the associated metadata information 252. The web browser can pull media from the server segment by segment in accordance with the MPD 242 as shown in 236. For instance, the web browser can request a first segment using a HTTP GET URL (frag 1 req) 244. A uniform resource locator (URL) or universal resource locator can be used to tell the web server which segment the client is to request 254. The web server can provide the first fragment (i.e., segment 1 246). For subsequent segments, the web browser can request a segment i using a HTTP GET URL (frag i req) 248, where i is an integer index of the segment. As a result, the web server can provide a segment i 250. The segments can be presented to the client via a media decoder/player 224.

Figure 3:
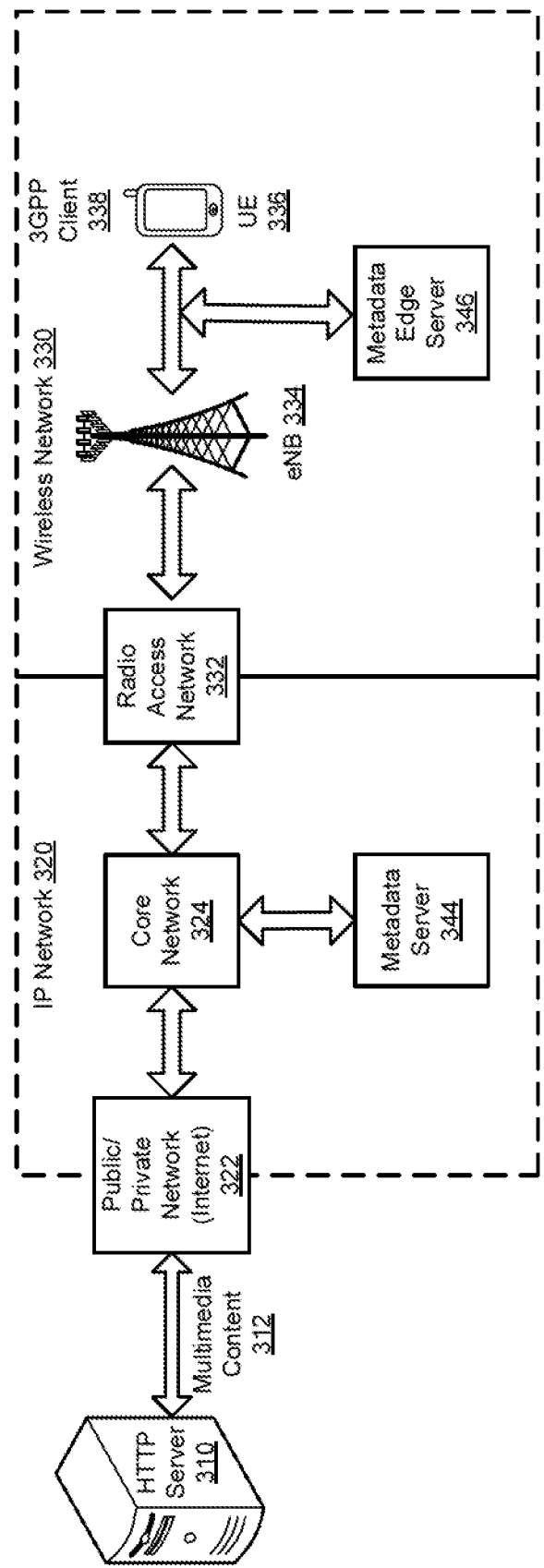
FIG. 3 illustrates a block diagram of an energy characterization-aware radio access network (RAN) architecture for hypertext transfer protocol-based (HTTP-based) video streaming in accordance with an example.

FIG. 3 illustrates a flow of multimedia content 312 between an HTTP server 310 providing the multimedia content to a 3GPP client 338 operating on a mobile device, such as a UE 336. The HTTP server can interface with a public or private network 322 (or the Internet) in communication with a core network 324 of a wireless wide area network (WWAN). In one embodiment, the WWAN can be a 3GPP LTE based network or an IEEE 802.16 based network (i.e. 802.16-2009). The core network can access a wireless network 330, such as an evolved packet system (EPS) via a radio access network (RAN) 332. The RAN can provide the multimedia content to the client operating on the UE via a node (e.g., an evolved Node B (eNB) 334).

In one embodiment, in addition to the client operating on a mobile device, an energy-efficient metadata management and proxy/server 344 can be configured to assist in managing the amount of energy/power used to encode, transmit, receive, decode, and display a multimedia stream. The metadata management and proxy/server may be located in the core network, such as in the evolved packet core. The proxy/server may be self-contained, or may be located in another server such as a Mobility Management Entity (MME) server or a Policy and Charging Rules Function (PCRF) server (not shown).

Alternatively, the metadata management server may be configured to operate as a proxy edge server 346. Through inspection of device capabilities (including decoding and display capabilities) and content characteristics, a proxy edge server may adapt the content served to its clients. For example, the contents from the proxy edge server may be adapted to a client by a certain transcoding or by metadata management. For instance, a DASH proxy server may decide to offer a new MPD in order to reduce available DASH representations to help UEs save power.

The newly introduced MPD attributes may also be used as part of a QoE metric reporting procedure. QoE, also referred to as a quality of user experience, can be a subjective measure of a customer's experiences with a service, application, and/or multimedia delivery. QoE systems can measure metrics that a user or a customer can directly perceive as a quality parameter.

For all services, a client may send a QOE report that includes information regarding the consumed energy/power for decoding and rendering the received multimedia files, such as video and/or audio. In an embodiment, the reported energy/power metrics may also include the amount of energy/power consumed during reception from the network, including the energy/power consumed in wireless reception and radio-level processing.

Energy Characterization of Streaming Multimedia

Based on the MPD metadata information that describes the relation of the segments and how they form a media presentation, a client can request the segments using HTTP GET or partial GET methods. The client can fully control the streaming session. For instance, the client can manage the on-time request and smooth play-out of the sequence of segments at the mobile device, potentially adjusting bitrates, coded types, frame rates, resolutions, and so forth to react to changes of the radio link or the user preferences.

In accordance with an embodiment of the present invention, for energy efficient streaming over DASH, content-dependent energy or power parameters, referred to herein as energy characterization information, can be derived for streaming media. The term energy characterization is a determination of the amount of energy and/or power it may take a mobile device to decode and display a streaming video. The energy characterization can be based on decoding and rendering complexity for each DASH representation. The energy characterization may be predetermined, or determined in near real time by a video encoder, a server such as a DASH server, or through another desired means. In one embodiment, the content-dependent energy/power parameters can be determined by capturing content-specific information such as frame pixel histograms, maximum frame-pixel value, block coded types, deblocking filtering numbers, and so forth, for a bitstream. The information can then be mapped to a single energy/power metric for each DASH representation.

The DASH client can then use this information to estimate the potential energy/power consumption that will be incurred for each of the DASH representations. The DASH client can make selections of a DASH representation that provides desired energy metrics based on energy-efficient codec processing, display rendering, the number of bits received, and so forth.

Providing an energy characterization in a manifest file, such as the MPD metadata, enables a mobile device to select a best possible multimedia format based on the power available to the mobile device. For example, a mobile device may be receiving a strong, broadband wireless signal. Typically the strong signal may allow a media client operating on the mobile device to select the highest possible resolution, such as the 5 Mbps representation in FIG. 1. However, if the battery level is relatively low at the mobile device, a representation with a lower energy characterization value may be selected to enable a user to finish watching a media presentation before the power at the mobile device is depleted. With sufficient granularity, various segments or sub-segments of a streaming media file may be communicated with different qualities.

For example, segments of a media presentation in which there is little movement can have a higher level of encoding, enabling fewer bits to be sent and less power used to decode and display the segments. Conversely, segments of the media presentation with more motion, or a large number of changes in the images can require a larger amount of information to communicate the image and may also use more processor power to decode and display the frequently changing images. Certain changes, such as a change in the type of codec used, may not even be noticeable to an end user, while substantially changing the amount of power used to decode and render a streaming media file. Accordingly, the media client may select a representation, segment, or sub-segment based on the energy characterization communicated in the MPD and/or the energy or power available at the mobile device.

In one embodiment, a manifest file for HTTP adaptive streaming (i.e. the MPD metadata information in the context of DASH) can include, at a representation and/or sub-representation level, energy characterization information, in addition to the typical bitrate, resolution, frame rate, and other information that is typically sent. The energy/power characterization information can be included on different encoded versions of the various media components, such as the video and audio. Moreover, the manifest file, such as the MPD, may also contain energy/power characterization information across segments and sub-segments of the various representations and sub-representations within a period or byte range to signal variations in content energy/power requirements within the media presentation in a more granular fashion to enable more dynamic adaptations in an energy efficient fashion.

The client, operating on a mobile device such as the UE illustrated in FIG. 3, can receive the manifest file (i.e. MPD) and request segments and sub-segments corresponding to the various DASH representations. In requesting a segment or sub-segment, the client can take into account the energy/power characterization information in the MPD. The client may switch across different representations over random access points (also known as segment access points (SAP) in DASH) by continuously tracking the power consumption in the client terminal in an effort to save battery life and optimize user quality of experience (QoE).

Referring again to FIG. 1, the DASH MPD can be configured to operate in accordance with an energy-efficient adaptive streaming framework. The new MPD attributes for energy-efficient streaming can be included in the MPD at a desired granularity level.

For example, adaptation sets 104 can include energy/power characterization information with two new attributes, a minimum energy/power attribute which specifies a minimum energy/power value in all representations 106 in the adaptation set; and a maximum energy/power attribute that specifies a maximum energy/power value in all of the representations in this adaptation set.

The minimum and maximum energy/power attributes may quantify the minimum and maximum energy/power levels over a specified timeline that may correspond to a period, such as a period ID 103, a segment 108 or a sub-segment 112. In an embodiment, these values may indicate a long-term (or average) minimum and maximum energy/power measure over the entire duration of the adaptation set. In another embodiment, vectorized sets of energy/power values may be provided specifying the minimum and maximum energy/power levels for the adaptation set across different segments and sub-segments.

In another embodiment, each representation 106 may contain a new (i.e. different) attribute on energy/power, assigning an energy/power value based on the content in the representation, the encoding type, and so forth. This value may quantify the energy/power level over a specified timeline that may correspond to a period, segment 108, or sub-segment 112. In an embodiment, the energy/power value may indicate a long-term (or average) energy/power measure over the entire duration of the representation. In another embodiment, vectorized sets of energy/power values may be provided specifying energy/power levels across different segments and sub-segments of the representation.

Alternatively, two new attributes, the minimum energy/power attribute and the maximum energy/power attribute may also be declared at the representation 106 level, quantifying the energy/power levels over a specified timeline that may correspond to a period 103, a segment 108 or a sub-segment 112. The segment information can include the energy/power used in initialization 110 of the segment, as well as the power energy power used to decode and display each sub-segment 112. In an embodiment, these values may indicate long-term (or average) minimum and maximum energy/power measures over the entire duration of the representation. In another embodiment, vectorized sets of energy/power values may be provided specifying the minimum and maximum energy/power levels across different segments and sub-segments of the representation.

Each sub-representation 112 may contain a new attribute on energy/power, assigning an energy/power value to the content in the sub-representation. This value may quantify the energy/power level over a specified timeline that may correspond to a period, segment or sub-segment. In an embodiment, this value may indicate a long-term (or average) energy/power measure over the entire duration of the sub-representation. In another embodiment, vectorized sets of energy/power values may be provided that specify energy/power levels across different segments and sub-segments of the sub-representation.

Segments and sub-segments may themselves contain new attributes describing energy/power in a more granular fashion at the segment and/or sub-segment level. In an embodiment, the energy/power levels may be specified for a given byte range within a segment or sub-segment. In broader terms, energy/power attributes may be associated with any byte range in a segment or sub-segment, or any byte range that spans across multiple segments or sub-segments.

In addition to DASH, additional standards can also be configured to enable multimedia adaptation capabilities for managing and enhancing energy efficiency of mobile devices. For example, in the 3GP file format, content-specific energy/power characterization metadata can be embedded at the 3GP file format container level. For instance, the energy characterization information can be embedded when capturing/uploading a video in an MMS setting, thereby generating a 3GP file with embedded energy/power characterization attributes. The mobile device can then use the embedded energy/power characterization attributes to select and perform streaming media files based on a user preference, the available power, a power consumption rate at the mobile device, or a combination of factors.

PSS and MBMS: Content-specific energy/power characterization metadata can be included in the session description protocol (SDP) signaling for session description and capability negotiation. Moreover, the real-time streaming protocol (RTSP) signaling may include content-specific energy/power characterization metadata. As such, the PSS and MBMS clients can understand the energy/power characteristics of the incoming content and manage their decoding and display processes in a more informed way to meet a desired or predetermined power budget.

In the case of PSS, the PSS client may further initiate a session re-negotiation via RTSP/SDP signaling in response to observing that it is running low on power. The PSS client can ask a PSS server to send different content with lower energy/power requirements, as previously discussed. A PSS server may perform transcoding operations in response to such a request to deliver content to the PSS client that will meet the power budget of a mobile device, such as a UE terminal.

Figure 4:
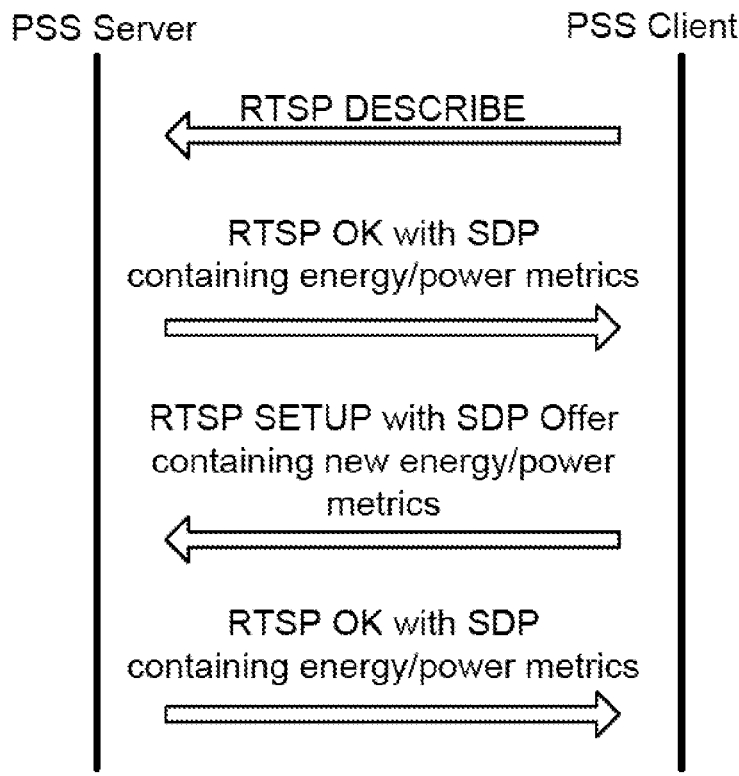
FIG. 4 illustrates a diagram of a communication between a packet-switched streaming services (PSS) server and a PSS client to provide content-specific energy/power characterization metadata in accordance with an example.

FIG. 4 illustrates one example of communication between a PSS server and a PSS client to provide content-specific energy/power characterization metadata that can be used to manage a power budget at a mobile device. In this example, an RTSP describe request is sent from the PSS client at the mobile device to the PSS server. The PSS server may operate in the core network (324 in FIG. 3) or may communicate with the 3GPP client via the public network 322. A describe request can include an RTSP uniform resource locator (URL) along with the type of reply data that can be handled. The PSS server can then reply with an RTSP OK, along with the presentation description, typically in a Session Description Protocol (SDP) format. The presentation description can list the media streams controlled with the aggregate URL. In this example, the SDP can also include energy/power characterization metrics for the available media streams. The PSS client can then communicate an RTSP setup request with an SDP offer that contains new energy/power characterization metrics. For example, the PSS client may request a new stream that can reduce power consumption at the mobile device on which the PSS client operates. The PSS server can respond with an RTSP OK with SDP containing the desired energy/power metrics.

Figure 6:
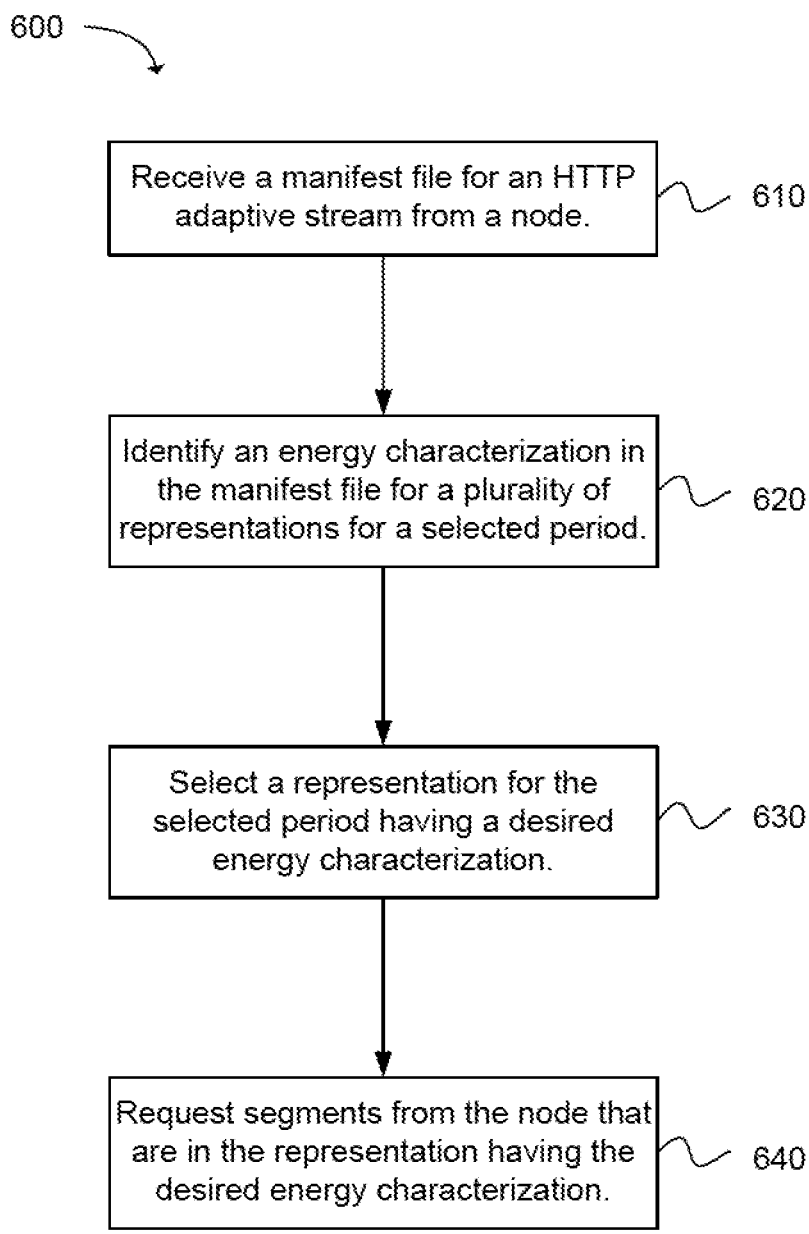
FIG. 6 depicts functionality of computer circuitry of a mobile device operable to provide HTTP adaptive streaming in accordance with an example.

One example provides functionality 600 of computer circuitry of a mobile device operable to provide hyper-text transfer protocol (HTTP) adaptive streaming, as shown in the flow chart in FIG. 6. In addition, the functionality may be implemented as a method or the functionality may be executed as instructions on a machine, where the instructions are included on at least one computer readable medium or one non-transitory machine readable storage medium.

In the example illustrated in FIG. 6, the computer circuitry can be configured to receive a manifest file for an HTTP adaptive stream from a node, as in block 610; identify an energy characterization in the manifest file for a plurality of representations for a selected period, as in block 620; select a representation for the selected period having a desired energy characterization, as in block 630; and request segments from the node that are in the representation having the desired energy characterization, as in block 640.

In various different configurations, the manifest file for the HTTP adaptive stream may be: a media presentation description (MDP) for a dynamic adaptive streaming over HTTP (DASH) adaptation set; metadata embedded in a 3GP file format; a session description protocol (SDP) in a packet-switched streaming service (PSS) based on a real-time streaming protocol (RTSP) or a third generation partnership program (3GPP) based multimedia broadcast and multicast service (MBMS); or metadata embedded in the RTSP for the PSS or the MBMS.

In an example, the computer circuitry is further configured to communicate, to a content server, via the node, an energy characterization for power consumed during reception, decoding, or rendering of the HTTP adaptive stream. The mobile device can receive a representation having a different energy characterization from the content server, based on the energy characterization reported to the content server. The computer circuitry can determine a power budget of the mobile node to decode and perform the HTTP adaptive stream. The representation selected for the selected period can have the desired energy characterization for the power budget.

In an example, the computer circuitry is further configured to: identify an energy characterization in the manifest file for a plurality of sub-representations for the selected period; and request sub-segments from the node that are in at least one of the sub-representations and have a desired energy characterization.

In another example, the computer circuitry is further configured to switch to a different representation having a different energy characterization at a selected access point in the HTTP adaptive stream to change an amount of power consumed by the mobile device to decode and perform the HTTP adaptive stream.

Figure 7:
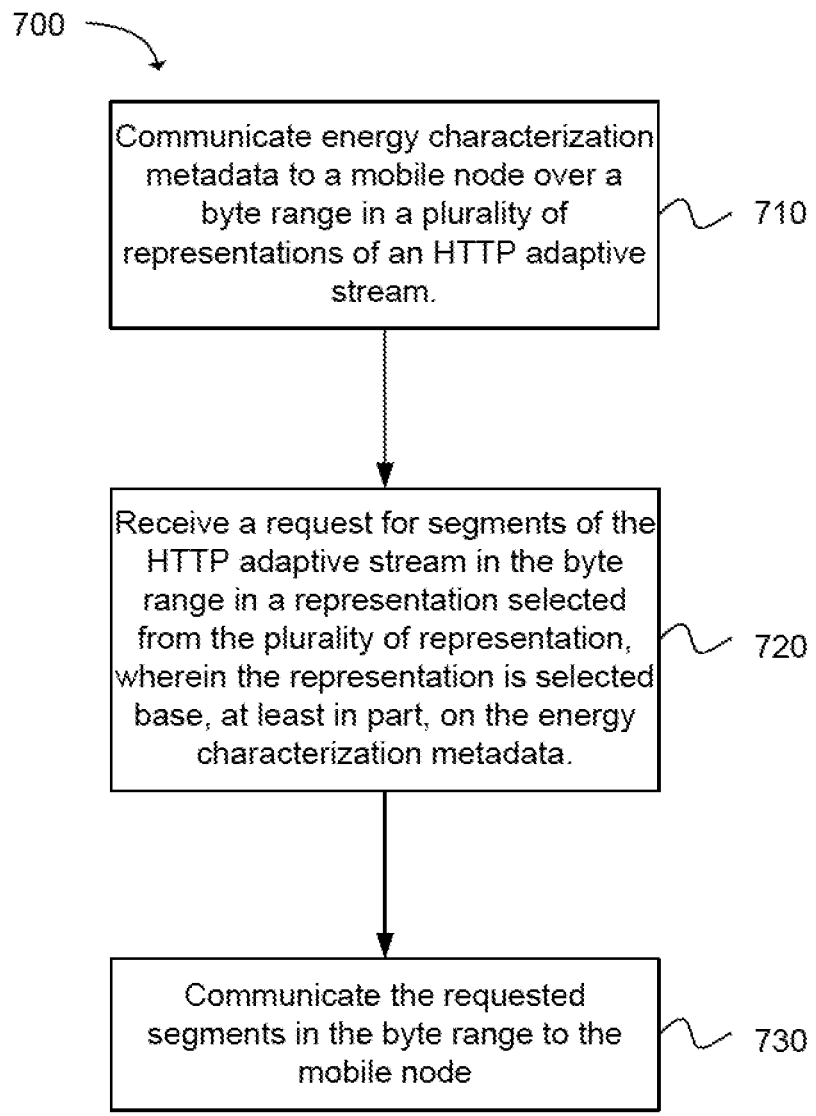
FIG. 7 depicts functionality of computer circuitry of a media server operable to provide HTTP adaptive streaming in accordance with an example.

Another example provides functionality 700 of computer circuitry of a media server operable to provide hyper-text transfer protocol (HTTP) adaptive streaming, as shown in the flow chart in FIG. 7. In addition, the functionality may be implemented as a method or the functionality may be executed as instructions on a machine, where the instructions are included on at least one computer readable medium or one non-transitory machine readable storage medium.

In the example illustrated in FIG. 7, the computer circuitry can be configured to: communicate energy characterization metadata to a mobile device over a byte range for a plurality of representations of an HTTP adaptive stream, as in block 710; receive a request for segments of the HTTP adaptive stream in the byte range in a representation selected from the plurality of representations, wherein the representation is selected based, at least in part, on the energy characterization metadata, as in block 720; and communicate the requested segments in the byte range to the mobile device, as in block 730.

In an example, the computer circuitry of the embodiment of FIG. 7 is further configured to determine the energy characterization metadata over the byte range based on content-specific information comprising frame pixel histograms, a maximum frame-pixel value, a block coded type, or deblocking filtering numbers.

In an example, the computer circuitry is further configured to determine a minimum and a maximum power level for segments over the byte range. The byte range can be for a period, an adaptation set, a representation, a segment or a sub-segment. In addition, the computer circuitry is further configured to provide a vectorized set of energy/power values to specify a minimum and a maximum energy level of each period, adaptation set, representation, segment or sub-segment in the energy characterization metadata.

In an example, the manifest file for the HTTP adaptive stream is: a media presentation description for a dynamic adaptive streaming over HTTP (DASH) adaptation set; metadata embedded in a 3GP file format; a session description protocol (SDP) in a packet-switched streaming service (PSS) based on a real-time streaming protocol (RTSP) or a third generation partnership program (3GPP) based multimedia broadcast and multicast service (MBMS); or metadata embedded in the RTSP for the PSS or MBMS.

In an example, the computer circuitry is further configured to receive the request for segments of the HTTP adaptive stream in the byte range, wherein the segments are located in an adaptation set that includes the plurality of representations, and at least one representation includes a plurality of segments. Each representation can contain a same media file over the byte range that is encoded differently than other representations. The encoding can include a bit rate, a frame rate, a resolution, or a codec type.

In an example, the computer circuitry is further configured to: receive a quality of experience (QoE) report from the mobile device that includes a power metric associated with power that is consumed at the mobile device during reception, decoding, or rendering of the HTTP adaptive stream; and communicate a different representation to the mobile device based on the power metric received in the QoE report.

In another example, the computer circuitry is further configured to: receive a request for segments of the HTTP adaptive stream in the byte range in a different representation selected from the plurality of representation, wherein the different representation is selected based, at least in part, on energy usage at the mobile device; and communicate the requested segments in the byte range to the mobile device.

Energy Characterization of Conversational Video

Video streaming typically involves communicating a video stream from a server to a mobile device. Thus, power consumption concerns are typically only relevant at the receiving end, at the mobile device where the streaming video is received, decoded, and displayed.

In contrast, conversational video, such as teleconferencing, can occur between two mobile devices. The implementation of conversational video can be more complex, since there are power consumption concerns at both the transmitting and receiving devices. Accordingly, there are power consumption concerns regarding the encoding and transmitting of multimedia streams as well as the reception, decoding and rendering of the multimedia streams.

In one embodiment, a single mobile device may be assigned to determine the encoding and decoding levels for two or more mobile devices participating in a conversational video stream. In another embodiment, a device with the lowest power may be selected to determine the encoding and decoding. Since the encoding level at a transmitter determines the decoding level at the receiver, and vice versa, the encoding and decoding decisions are linked. Thus, the device with the lowest power (i.e. a low battery level) may designate a lower level of encoding (and therefore decoding) at both ends of a two way video conference. The same may also be true for a multi-way conversational video stream between a plurality of mobile devices.

Figure 5:
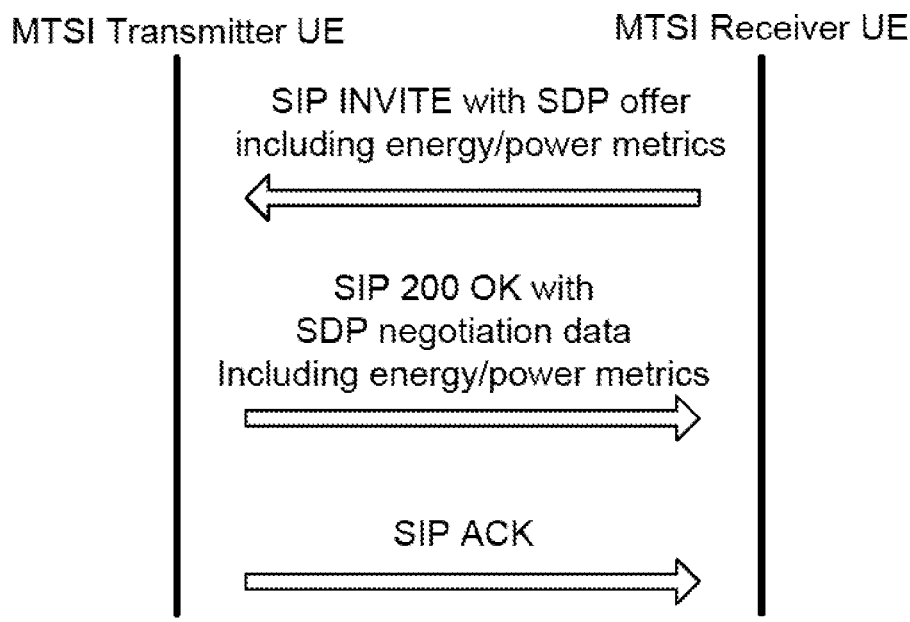
FIG. 5 illustrates a diagram of a communication between a multimedia telephony services over IMS (MTSI) transmitter user equipment (UE) and an MTSI receiver UE to provide content-specific energy/power characterization metadata in accordance with an example.

One standard that can include energy/power characterization metrics for use in conversational video is the multimedia telephony services over IMS (MTSI). When using MTSI, content-specific energy/power characterization metadata can be included in the session description protocol (SDP) signaling for a session description and capability negotiation between a transmitting mobile device and a receiving mobile device, as illustrated in FIG. 5. The session initiation protocol (SIP) signaling may also include content-specific energy/power characterization metadata (SIP serves as the application-layer control protocol to establish, modify, and terminate conversational multimedia sessions such as video conferences, Internet telephony calls, etc.).

Furthermore, the SDP signaling can also include energy/power characterization metadata with regards to content capturing and encoding complexity. Therefore, the UEs acting as MTSI transmitter and MTSI receiver terminals can use the new SDP attributes on the energy/power characterization metadata for decoding and rendering complexity as well as for capturing and encoding complexity. The energy/power characterization metadata can be used to negotiate the MTSI session parameters and determine the appropriate content to be exchanged between the UEs during the conversational video session, e.g., via SIP/SDP signaling procedures.

An exemplary illustration for such signaling is provided in FIG. 5. A SIP Invite with SDP offer is sent from the MTSI transmitter UE to the MTSI Receiver UE. The SDP can include energy/power metrics as previously discussed. The MTSI receiver UE can respond with an SIP 2000K acknowledgement with SDP negotiation data that includes energy/power characterization metrics for the MTSI Receiver UE. The MTSI Transmitter UE can then send an SIP ACK to the MTSI Receiver UE.

Figure 8:
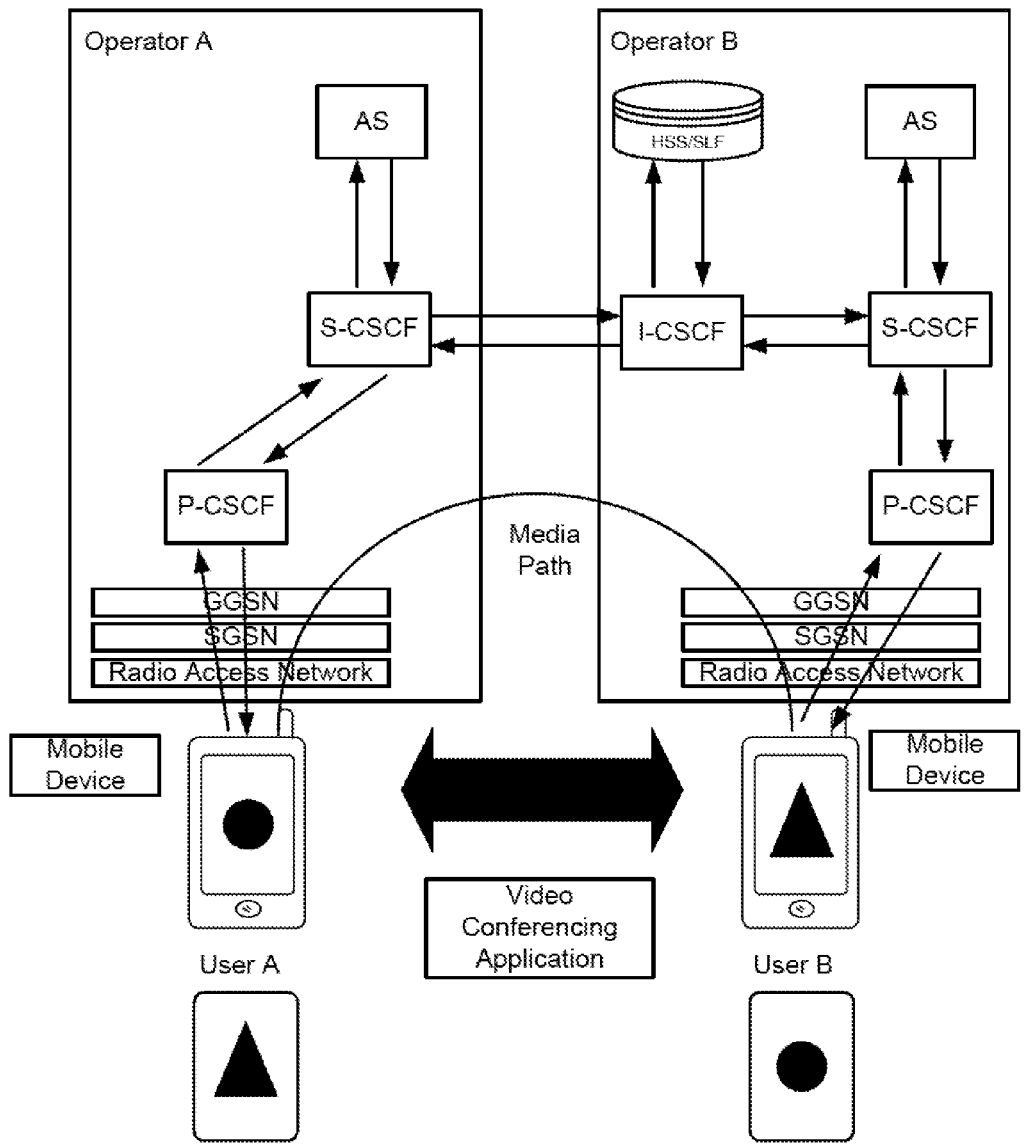
FIG. 8 illustrates a block diagram of an energy characterization-aware video conferencing application over an MTSI-based conversational video system in accordance with an example.

FIG. 8 provides an example illustration of the media path for conversational video between User A and User B. As previously discussed, 3GPP TS 26.114 (e.g. Rel. 11.0.0) describes the multimedia telephony services over IMS (MTSI) that allows delivery of advanced multimedia conversational services and content over IMS-based networks. This includes specification of media handling and interaction, which includes media control, media codecs, as well as transport of media and control data. An MTSI call uses the Call Session Control Function (CSCF) mechanisms to route control-plane signaling between the UEs of User A and User B involved in the call, as shown in FIG. 8. In the control plane, Application Servers (AS) can be present and may provide supplementary services such as call hold/resume, call forwarding and multi-party calls, etc.

In one embodiment, an MTSI-based transmitter UE terminal (i.e. User A's UE) can capture and records video and transfer the video to the MTSI-based receiver UE terminal (i.e. User B's UE) over the 3GPP network. The receiver UE terminal can then decode and render the video.

In MTSI, the session initiation protocol (SIP) serves as the application-layer control protocol to establish, modify, and terminate conversational multimedia sessions such as video conferences, Internet telephony calls, etc. Session description protocol (SDP) based signaling between the sending and receiving terminals allow for offer/answer considerations in the media-related capability negotiation, including codecs, bitrates, resolutions, etc. The transport of media in MTSI is based on the real-time transport protocol (RTP) (specified by IETF RFC 3550) over UDP/IP.

In one example, a transmit mobile device and a receive mobile device can be configured to perform conversational video. The transmit mobile device can determine a power budget of the transmit mobile device to encode and transmit the real-time transport protocol (RTP) adaptive stream to the receive mobile device. The transmit mobile device can then transmit an offer manifest file including a plurality of energy characterizations for real-time transport protocol (RTP) adaptive streams to be communicated to the receive mobile device. A receive mobile device can receive an offer manifest file for an RTP adaptive stream to be communicated from the transmit mobile device. The receive mobile device can determine a power budget of the receive mobile device to receive and decode the RTP adaptive stream communicated from the transmit device. The receive mobile device can identify an energy characterization in the offer manifest file for a desired RTP stream to receive from the transmit mobile device. The receive mobile device can signal the selected RTP stream in an answer manifest file to the transmit mobile device. The receive mobile device can receive the RTP stream corresponding to the selected energy characterization from the transmit mobile device.

Figure 9:
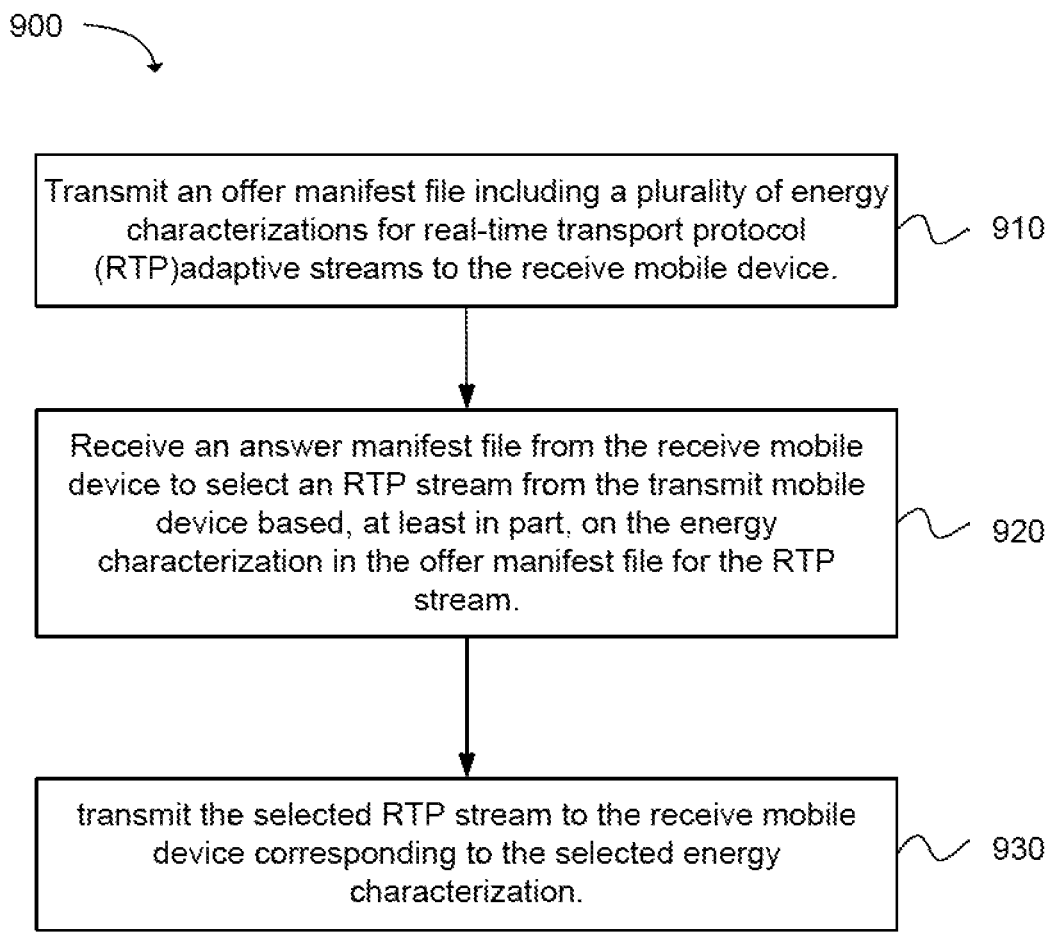
FIG. 9 depicts functionality of computer circuitry of a transmit mobile device operable to perform conversational video with a receive mobile device in accordance with an example.

Another example provides functionality 900 of computer circuitry of a transmit mobile device operable to perform conversational video with a receive mobile device, as shown in the flow chart in FIG. 9. The functionality may be implemented as a method or the functionality may be executed as instructions on a machine, where the instructions are included on at least one computer readable medium or one non-transitory machine readable storage medium.

In the example illustrated in FIG. 9, the computer circuitry can be configured to: transmit an offer manifest file including a plurality of energy characterizations for real-time transport protocol (RTP) adaptive streams to the receive mobile device, as in block 910; e, as in block 920; and transmit the selected RTP stream to the receive mobile device corresponding to the selected energy characterization, as in block 930.

In a further example the computer circuitry can be further configured to determine the energy characterization comprising a power budget for the transmit mobile device to encode and transmit the desired RTP adaptive stream communicated to the receive mobile device, wherein the transmit manifest file includes the energy characterization for a plurality of available RTP adaptive streams.

In another example, the energy characterization for the RTP adaptive stream is included in: a session description protocol (SDP) in a packet-switched streaming service (PSS) based on a real-time streaming protocol (RTSP) or a third generation partnership program (3GPP) based multimedia broadcast and multicast service (MBMS); or metadata embedded in the RTSP for the PSS or the MBMS.

In another example, the computer circuitry can be configured to transmit the offer manifest file enables the receive mobile device to: receive the offer manifest file for the RTP adaptive stream communicated from the transmit mobile device; determine a power budget of the receive mobile device to receive and decode the RTP adaptive stream communicated from the transmit device; identify an energy characterization in the offer manifest file for a desired RTP stream to receive from the transmit mobile device; and signal the selected RTP stream in an answer manifest file to the transmit mobile device.

Figure 10:
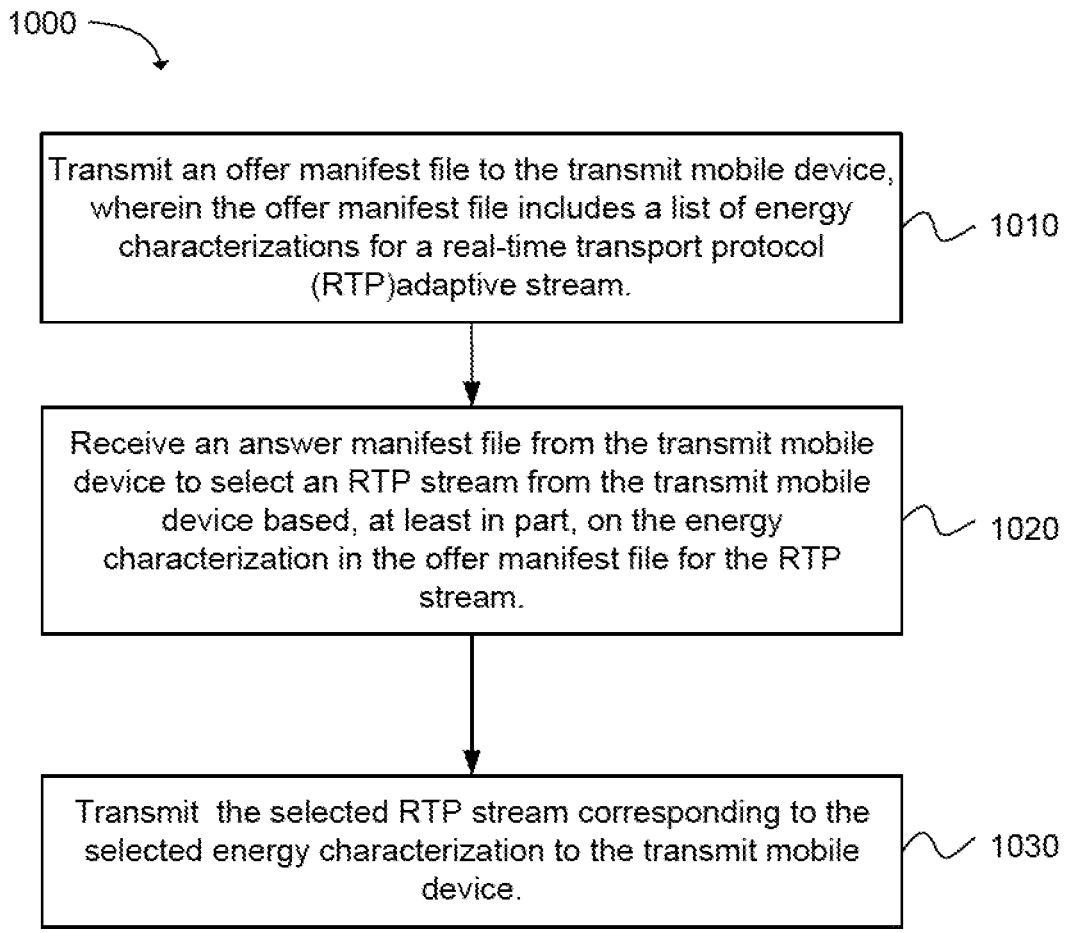
FIG. 10 depicts functionality of computer circuitry of a receive mobile device operable to perform conversational video with a transmit mobile device in accordance with an example.

Another example provides functionality 1000 of computer circuitry of receive mobile device and operable to perform conversational video with a transmit mobile device, as shown in the flow chart in FIG. 10. The functionality may be implemented as a method or the functionality may be executed as instructions on a machine, where the instructions are included on at least one computer readable medium or one non-transitory machine readable storage medium.

In the example illustrated in FIG. 10, the computer circuitry can be configured to: transmit an offer manifest file to the transmit mobile device, wherein the offer manifest file includes a list of energy characterizations for a real-time transport protocol (RTP) adaptive stream, as in block 1010; receive an answer manifest file from the transmit mobile device to select an RTP stream from the transmit mobile device based, at least in part, on the energy characterization in the offer manifest file for the RTP stream, as in block 1020; and transmit the selected RTP stream corresponding to the selected energy characterization to the transmit mobile device, as in block 1030.

In another example, the computer circuitry is further configured to: determine that a power level of the receive mobile device is below a selected threshold level; initiate a session re-negotiation using a PSS client via RTSP or SDP signaling; request a PSS server to send the RTP adaptive stream with a stream having a lower energy or power consumed by the mobile device to receive, decode, and render the stream; and receive the requested stream having the lower energy or power.

In another example, the computer circuitry is further configured to transmit the offer manifest file enables the transmit mobile device to: receive the offer manifest file for the RTP adaptive stream communicated from the receive mobile device; determine a power budget of the transmit mobile device to receive and decode the RTP adaptive stream communicated from the receive device; identify an energy characterization in the offer manifest file for a desired RTP stream to receive from the receive mobile device; and signal the selected RTP stream in an answer manifest file to the receive mobile device.

In another example, the computer circuitry is configured to receive a request for a desired RTP stream from the transmit mobile device, wherein the desired RTP stream is selected based, at least in part, on a power budget of the transmit mobile device.

In another example, the offer manifest file and the answer manifest file for the RTP adaptive stream are communicated in a session description protocol (SDP) or a session initiation protocol (SIP) of a multimedia telephony services over an IP multimedia subsystem (IMS) (MTSI) session.

In another example, one of the receive mobile device and the transmit mobile device can determine the energy characterization for the RTP stream to be transmitted and received, wherein the determination is based, at least in part on: a lowest power level of the receive mobile device or the transmit mobile device; and a predetermined relationship of the receive mobile device and the transmit mobile device.

In another example, the computer circuitry is configured to: receive the receive manifest file for the real-time transport protocol (RTP) adaptive stream communicated from the transmit node; encode segments for an RTP adaptive stream communicated to the transmit node based on energy characterization information in the receive manifest file for the transmit node; and communicate the segments to the transmit node.

In another example, the offer manifest file including the list of energy characterizations is included in a session description protocol (SDP) in a packet-switched streaming service (PSS) based on a real-time streaming protocol (RTSP) or a third generation partnership program (3GPP) based multimedia broadcast and multicast service (MBMS); or metadata embedded in the RTSP for the PSS or the MBMS.

Figure 11:
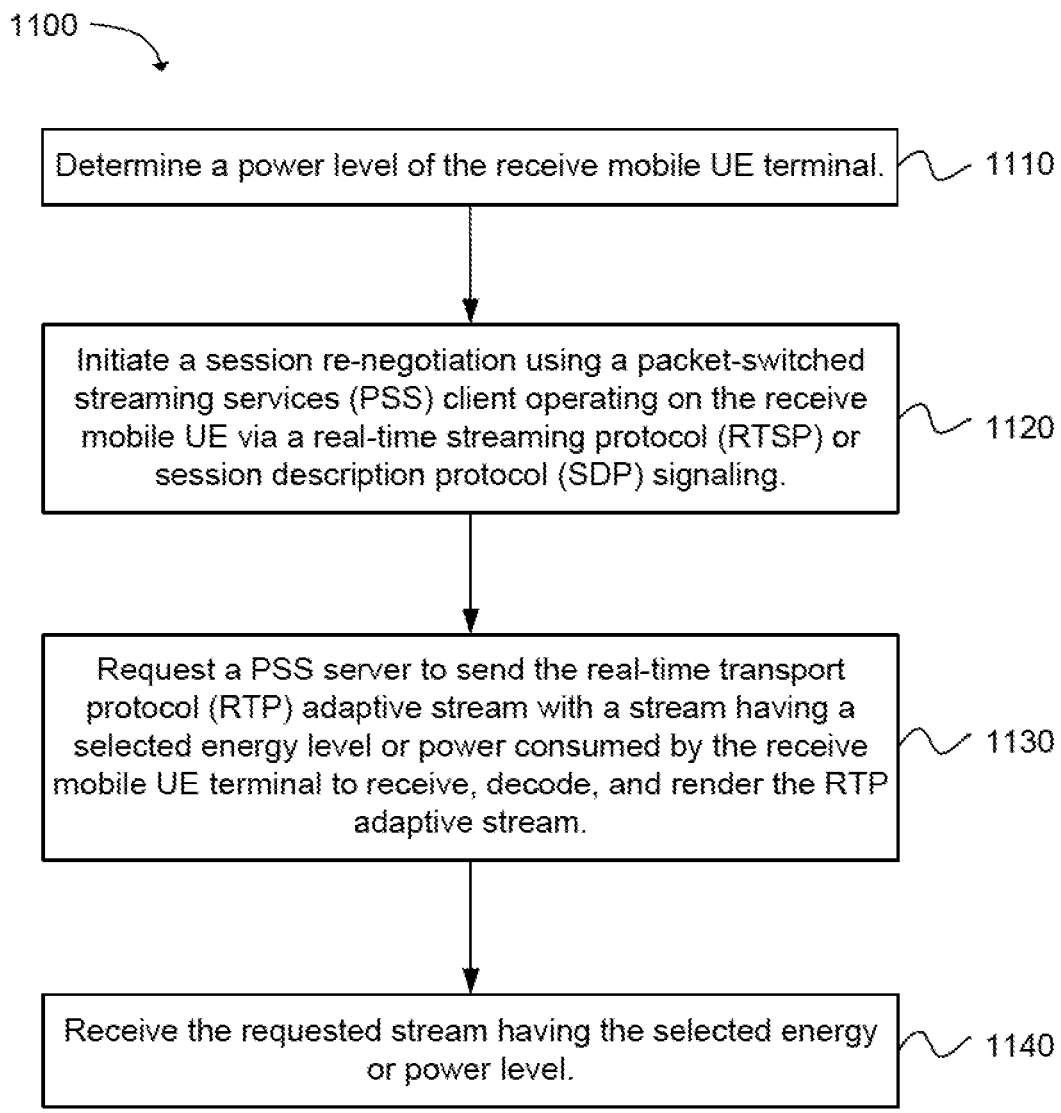
FIG. 11 depicts functionality of computer circuitry of a receive mobile user equipment (UE) terminal operable to receive a real-time transport protocol (RTP) adaptive stream from a transmit mobile UE terminal in accordance with an example.

Another example provides functionality 1100 of computer circuitry of a receive mobile user equipment (UE) terminal operable to receive a real-time transport protocol (RTP) adaptive stream from a transmit mobile UE terminal, as shown in the flow chart in FIG. 11. The functionality may be implemented as a method or the functionality may be executed as instructions on a machine, where the instructions are included on at least one computer readable medium or one non-transitory machine readable storage medium.

In the example illustrated in FIG. 11, the computer circuitry can be configured to: determine a power level of the receive mobile UE terminal, as in block 1110; initiate a session re-negotiation using a packet-switched streaming services (PSS) client operating on the receive mobile UE via a real-time streaming protocol (RTSP) or session description protocol (SDP) signaling, as in block 1120; request a PSS server to send the real-time transport protocol (RTP) adaptive stream with a stream having a selected energy level or power consumed by the receive mobile UE terminal to receive, decode, and render the RTP adaptive stream, as in block 1130, and receive the requested stream having the selected energy or power level, as in block 1140.

In an example, the request to send the RTP adaptive stream with the stream having the selected energy level or power consumed by the receive mobile UE terminal can be sent in: a session description protocol (SDP) in a packet-switched streaming service (PSS) based on a real-time streaming protocol (RTSP) or in a third generation partnership program (3GPP) based multimedia broadcast and multicast service (MBMS); or metadata embedded in the RTSP for the PSS or in the MBMS.

Figure 12:
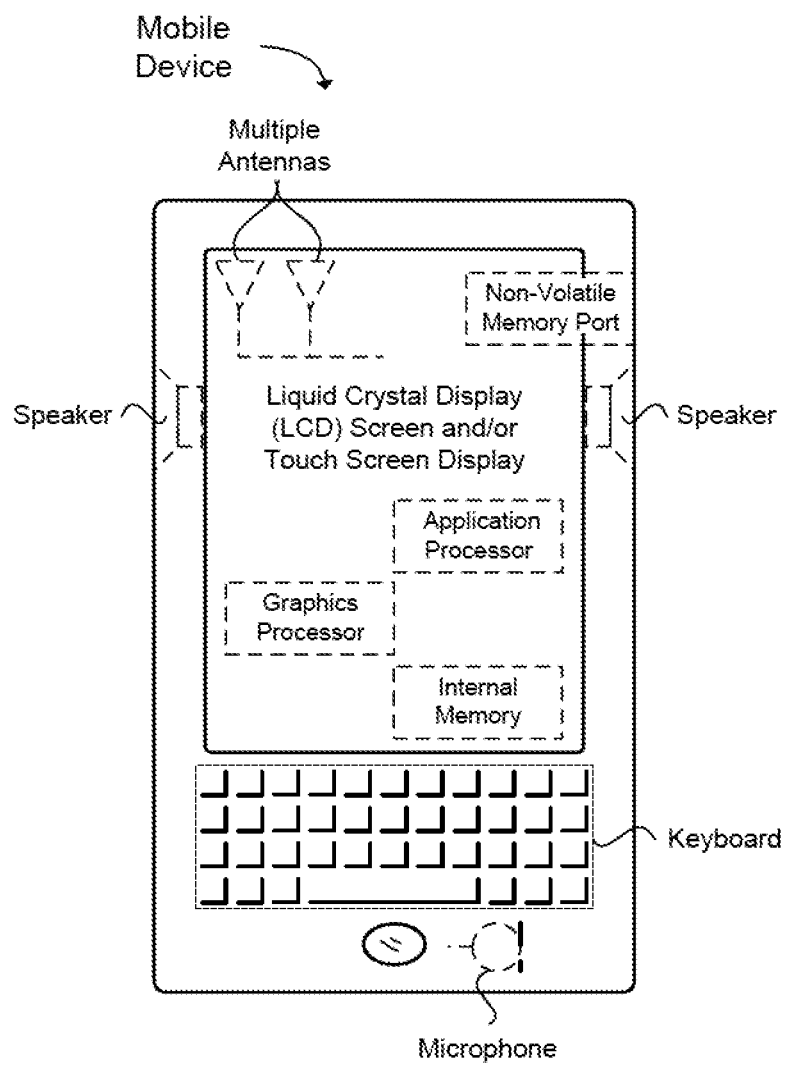
FIG. 12 illustrates a diagram of a wireless device (e.g., UE) in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A mobile device operable to provide hyper-text transfer protocol (HTTP) adaptive streaming, having computer circuitry hardware configured to:
   receive a manifest file for an HTTP adaptive stream from a node;
   identify an energy characterization in the manifest file for each of a plurality of representations for a selected period, wherein the energy characterization is a determination of an amount of energy or power used by the mobile device to decode and display the HTTP adaptive stream of a representation of the plurality of representations for the selected period and includes at least a first attribute defining a minimum energy value for each of the plurality of representations for the selected period and a second attribute defining a maximum energy level for each of the plurality of representations for the selected period;
   select a representation for the selected period having a desired energy characterization; and
   request segments from the node that are in the representation having the desired energy characterization.

2. The computer circuitry hardware of claim 1 wherein the computer circuitry is further configured to:
   determine a power budget of the mobile device to decode and perform the HTTP adaptive stream; and select the representation for the selected period having the desired energy characterization for the power budget.

3. The computer circuitry of claim 1 wherein the energy characterization for the HTTP adaptive stream is included in:
- a media presentation description for a dynamic adaptive streaming over HTTP (DASH) adaptation set; or
- metadata embedded in a 3GP file format.

4. The computer circuitry hardware of claim 1, wherein the computer circuitry is further configured to communicate, to a content server, via the node, an energy characterization for power consumed during reception, decoding, or rendering of the HTTP adaptive stream.

5. The computer circuitry hardware of claim 4, wherein the mobile device receives a representation having a different energy characterization from the content server, based on the energy characterization reported to the content server.

6. The computer circuitry hardware of claim 1, wherein the computer circuitry is further configured to:
- identify an energy characterization in the manifest file for a plurality of sub-representations for the selected period; and
- request sub-segments from the node that are in at least one of the sub-representations and have a desired energy characterization.

7. The computer circuitry hardware of claim 1, wherein the computer circuitry is further configured to switch to a different representation having a different energy characterization at a selected access point in the HTTP adaptive stream to change an amount of power consumed by the mobile device to decode and perform the HTTP adaptive stream.

8. The computer circuitry hardware of claim 1, wherein the media device is in communication with a metadata management server configured to communicate the energy characterization information.

9. A media server operable to provide hyper-text transfer protocol (HTTP) adaptive streaming, having computer circuitry hardware configured to:
- communicate energy characterization metadata to a mobile device over a byte range for a plurality of representations of an HTTP adaptive stream, wherein the energy characterization is a determination of an amount of energy or power used by the mobile device to decode and display the HTTP adaptive stream of a representation of the plurality of representations for the selected period and includes at least a first attribute defining a minimum energy value for each of the plurality of representations for the selected period and a second attribute defining a maximum energy level for each of the plurality of representations for the selected period;
- receive a request for segments of the HTTP adaptive stream in the byte range in a representation selected from the plurality of representations, wherein the representation is selected based, at least in part, on the energy characterization metadata; and
- communicate the requested segments in the byte range to the mobile device.

10. The computer circuitry hardware of claim 9, wherein the computer circuitry is further configured to determine the energy characterization metadata over the byte range based on content-specific information comprising frame pixel histograms, a maximum frame-pixel value, a block coded type, or deblocking filtering numbers.

11. The computer circuitry hardware of claim 9, wherein the computer circuitry is further configured to determine a minimum and a maximum power level for segments over the byte range.

12. The computer circuitry hardware of claim 9, wherein the byte range is for a period, an adaptation set, a representation, a segment or a sub-segment.

13. The computer circuitry hardware of claim 9, wherein the computer circuitry is further configured to provide a vectorized set of energy/power values to specify a minimum and a maximum energy level of each period, adaptation set, representation, segment or sub-segment in the energy characterization metadata.

14. The computer circuitry hardware of claim 9, wherein the manifest file for the HTTP adaptive stream is:
- a media presentation description for a dynamic adaptive streaming over HTTP (DASH) adaptation set; or
- metadata embedded in a 3GP file format.

15. The computer circuitry hardware of claim 9, wherein the computer circuitry is further configured to receive the request for segments of the HTTP adaptive stream in the byte range, wherein the segments are located in an adaptation set that includes the plurality of representations, and at least one representation includes a plurality of segments.

16. The computer circuitry hardware of claim 9, wherein each representation contains a same media file over the byte range that is encoded differently than other representations, wherein the encoding includes a bit rate, a frame rate, a resolution, or a codec type.

17. The computer circuitry hardware of claim 9, wherein the computer circuitry is further configured to:
- receive a quality of experience (QoE) report from the mobile device that includes a power metric associated with power that is consumed at the mobile device during reception, decoding, or rendering of the HTTP adaptive stream; and
- communicate a different representation to the mobile device based on the power metric received in the QoE report.

18. The computer circuitry hardware of claim 9, wherein the computer circuitry is further configured to:
- receive a request for segments of the HTTP adaptive stream in the byte range in a different representation selected from the plurality of representation, wherein the different representation is selected based, at least in part, on energy usage at the mobile device; and
- communicate the requested segments in the byte range to the mobile device.

* * * * *